July 19, 1938. J. Q. SHERMAN Re. 20,804

AIR COOLING APPARATUS

Original Filed June 26, 1926 2 Sheets-Sheet 1

INVENTOR.
BY John Q. Sherman
ATTORNEY.
F. C. Walker

July 19, 1938. J. Q. SHERMAN Re. 20,804

AIR COOLING APPARATUS

Original Filed June 26, 1926 2 Sheets-Sheet 2

John Q. Sherman INVENTOR.

BY

T. E. Walker ATTORNEY.

Reissued July 19, 1938 Re. 20,804

UNITED STATES PATENT OFFICE 20,804

AIR COOLING APPARATUS

John Q. Sherman, Dayton, Ohio

Original No. 1,890,888, dated December 13, 1932, Serial No. 118,783, June 26, 1926. Application for reissue March 6, 1933, Serial No. 659,878

35 Claims. (Cl. 62—129)

Figure 1:
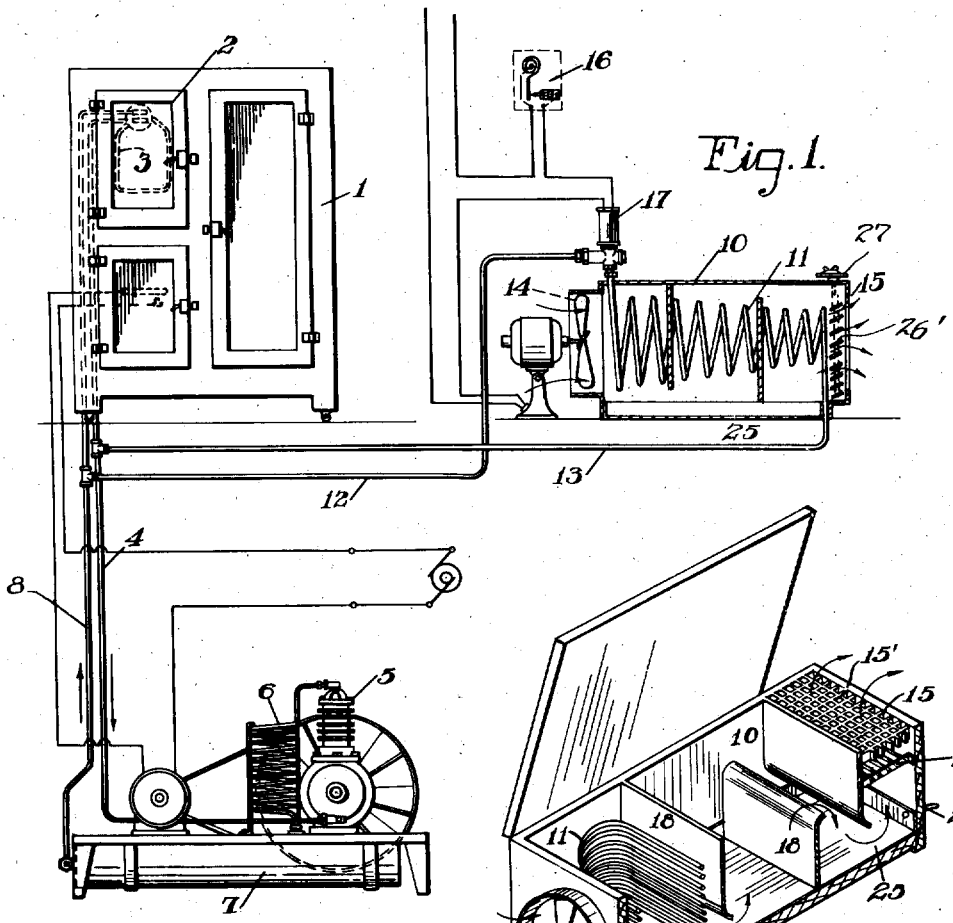

My invention relates to ventilating systems and more particularly to an air cooling apparatus for use in residences, hospital rooms, hotels, club rooms and the like. The apparatus is designed to not only cool the air but to insure circulation and to humidify the circulated air by restoring to it the moisture of condensation. In the present invention is contemplated the use of a refrigerating unit in combination with a fan or blower which will circulate a current of air over and through the expansion or absorption coils of a refrigerating apparatus, which will absorb from the circulated current of air a portion of its heat and at the same time restore to the cooled air, by evaporation, the moisture which shall have condensed upon such refrigeration coils during the cooling process.

The use of domestic or private refrigeration apparatus in homes, hotels, hospitals and clubs has become quite common. Such refrigeration units as ordinarily designed are given a very large factor of refrigeration capacity in excess of the normal requirements of a particular installation. It is quite common to give to such domestic or private refrigeration unit such excess capacity as to require the operation during only one fourth to one-third of the time; that is to say for each period of active operation of the compressor, such apparatus will thereafter remain idle for two to three times such period. It is contemplated that the present air cooling apparatus may be installed as an adjunct to such private or domestic refrigeration system and be operated thereby, utilizing a portion of the excess capacity of such refrigeration apparatus. The invention includes more particularly a compartment or passageway for the circulation of air, preferably having therein a series of baffles or deflectors giving to the air a circuitous course during which it is brought into intimate contact with a succession of refrigeration coils. This air passage discharges into the room that is to be cooled. The operation of the fan or blower for the air as well as the valve controlling the flow of refrigerant through such coils may be governed thermostatically in accordance with fluctuations of room temperature.

The object of the invention is to simplify the structure as well as the means and mode of operation of air circulating and cooling apparatus whereby it will not only be cheaper in construction but will be more efficient in operation, uniform in action, capable of being economically operated and unlikely to get out of repair.

A further object of invention is to provide air cooling and circulating apparatus capable of use in connection with a domestic or private refrigerating apparatus by utilizing a portion of the excess capacity of the refrigerating unit, but which air cooling apparatus is further capable of operation as a separate installation wholly independent of other cooling chambers, food refrigeration compartments, or ice making apparatus.

A further object of invention is to provide ventilating and cooling apparatus which will restore to the cooled air the extracted moisture of condensation.

A further object of invention is to provide for automatically controlling the ventilating and cooling apparatus in accordance with fluctuations of temperature.

With the above primary and other incidental objects in view as will more fully appear in the specifications, the invention consists of features of construction, the parts and combinations thereof, and the mode of operation, or their equivalents, as hereinafter described and set forth in the claims.

Figure 2:
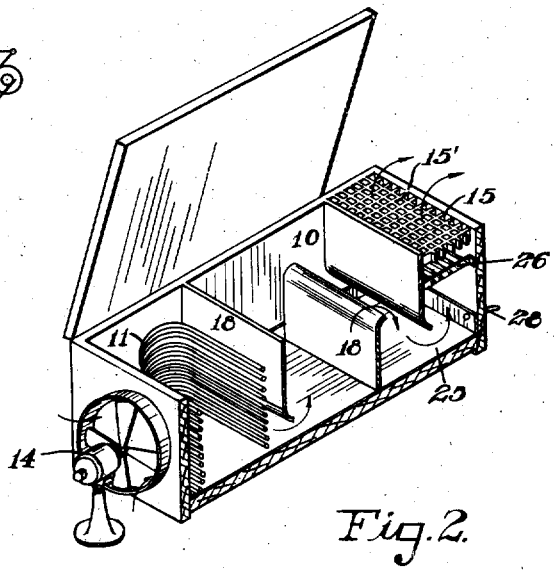
Figure 3:
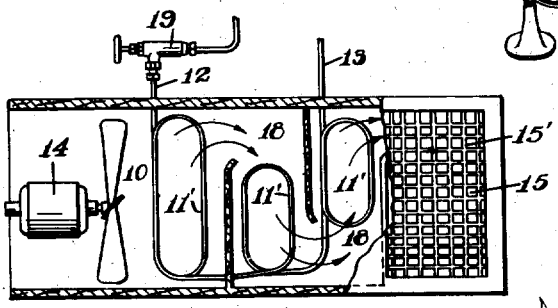
Figure 4:
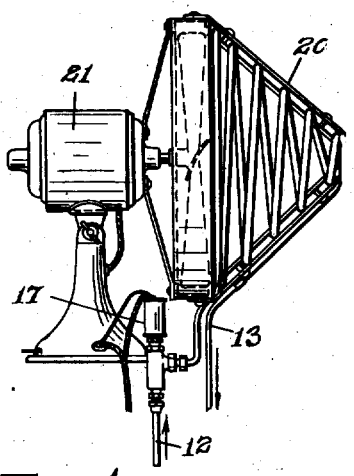
Figure 5:
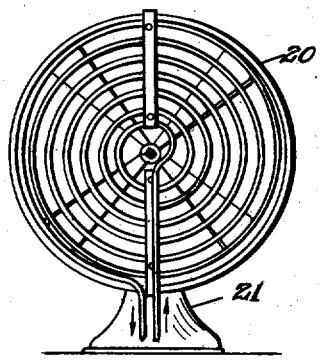
Figure 7:
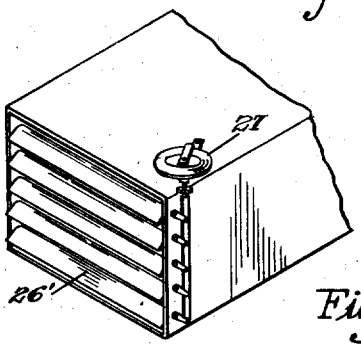
Figure 6:
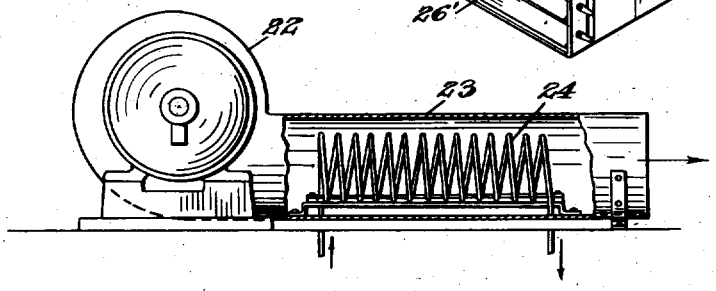
Figure 8:
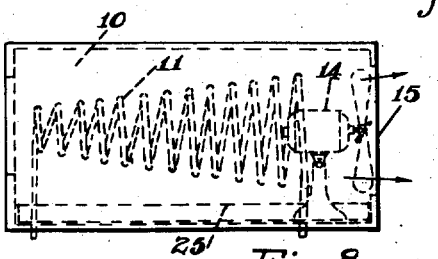

In the accompanying drawings wherein are shown the preferred but obviously not necessarily the only forms of embodiment of the invention, Fig. 1 is a front elevation of a typical domestic refrigeration installation to which the present air cooling and humidifying apparatus has been connected. Fig. 2 is a perspective view partly broken away of the air cooling and humidifying apparatus disconnected from the compressor and circulatory system for the refrigerant. Fig. 3 is a top plan view of the cooling and humidifying apparatus in a slightly modified form. Figs. 4 and 5 are respectively side and front elevations of a further modification of the air cooling and humidifying apparatus wherein the cooling or refrigerant coils are applied directly to a conventional form of electric fan. Fig. 6 shows the cooling apparatus applied to a blower of the centrifugal type in lieu of an electric fan. Fig. 7 is a perspective view of a thermostatically operated shutter for the air discharge opening. Fig. 8 illustrates a further modification employing a suction fan in lieu of a blower. Like parts are indicated by similar characters of reference throughout the several views.

Referring particularly to Fig. 1 of the drawings there is shown a domestic refrigeration installation of which 1 is the usual household refrigerator for containing and cooling food, in the ice compartment 2 of which are located the expansion coils 3 of the system. The refrigerator coils 3 are connected by a suction or exhaust conduit 4 with a motor driven compressor 5. The exhaust gas from the coil 3 is drawn into the compressor 5 and there compressed and discharged through a condenser 6, in which the compressed refrigerant is reduced to liquid form. The liquefied refrigerant is stored in a receiver or reservoir 7 from which it is supplied to the coils 3 in the household refrigerator 1 through the supply conduit 8.

At the right in Fig. 1 is shown the air cooling and humidifying apparatus forming the subject matter hereof. While this apparatus may be embodied in various forms, for illustrative purposes it has been shown in the drawings in a simplified form of embodiment as an adjunct to or supplemental to the domestic refrigerating apparatus. It will be understood, however, that while for economy of installation and operation it may be desirable to combine the present air cooling and humidifying apparatus with a domestic or private refrigerating system and so utilize the excess capacity of such system, it is to be understood that the domestic refrigerator 1 and the refrigeration coils may be omitted and the compressor 5, condenser 6 and receiver 7 may be utilized solely for one or more air cooling and humidifying units as shown at the right in Fig. 1 and as further illustrated in remaining Figures 2 to 6 inclusive.

This apparatus in its simplified form comprises a compartment or air tunnel 10 discharging into the room or chamber to be cooled. Located within the compartment or tunnel 10 is an expansion coil 11, through which is circulated a refrigerating medium. One extremity of the coil 11 is connected through the conduit 12 with the supply conduit 8 leading from the receiver 7. The return or exhaust conduit 4 is connected with the opposite end of the coil 11 through a branch exhaust conduit 13. Located at one end of the compartment or tunnel 10 is a fan or blower 14. In lieu of a blast fan such fan may be of the suction type as shown in Fig. 8 in which case the air is drawn through the compartment. For convenience of illustration this blower has been shown in the several figures as a conventional type of electric fan. The stream of air discharged from such blower or fan 14 passes through the compartment 10 and past the successive turns or convolutions of the coil 11 and is discharged from the opposite end of the compartment 10 through an opening 15 preferably provided with a suitable grill work or lattice 15' covering such opening. While for illustrative purposes the coils 3 and 11 are shown connected in parallel or in mutiple it is obvious they may be connected in series, since the coil 11 is required to produce a much less degree of cooling effect than the coil 3. The compartment 10 and the coil 11 may be of any suitable length according to the character of refrigerant employed, the size of the conduit forming the coil, the rapidity with which the air is cooled and the desired degree of temperature. There is shown in Fig. 1 a thermostatic switch 16 which not only controls the motor driving the fan or blower 14, but also controls an electrically operated valve 17 controlling the flow of refrigerant through the coil 11.

In Fig. 2 there is shown a modification wherein the compartment or tunnel 10 is provided with a series of baffles 18 which tend to resist or retard the flow of air. In this instance the refrigerating coil 11 is located adjacent to the blower or fan 14 and in advance of the first baffle 18 of the series. The effect of the baffles 18 in retarding the flow of air is to hold the body of air for a longer period in close association with the refrigeration coil 11 thereby cooling the air to a lower degree. After passing through the tortuous passage, the air is discharged through the outlet 15 as before described. Fig. 3 illustrates a similar construction wherein the baffles are horizontally offset instead of vertically offset as in Fig. 2. Furthermore, in Fig. 3, the refrigerating unit is shown formed in a succession of interconnected sections 11', one of which is located in each of the chambers or subcompartments between the successive baffles 18. Instead of providing an electrically operated controlled valve for the refrigerant coil, as shown in Fig. 3, a hand operated valve 19 may be used by which the flow of refrigerant may be regulated. Likewise, if so desired, the actuating motor for the fan or blower 14 may be manually turned on and off in lieu of the thermostatic control shown in Fig. 1. In Figs. 4 and 5 is shown a further modification wherein the turns or convolutions of the refrigeration unit or coil are formed into a cage 20 mounted upon an electric fan 21. This refrigerant coil 20 is positioned directly in front of the fan, which when in operation discharges air through the coils or turns of the refrigeration unit. Thus an electric fan used in the ordinary manner is made to deliver cooled air. Fig. 6 shows a somewhat similar construction wherein a centrifugal blower 22 delivers air through a tunnel or passage 23 in which is located the refrigeration coil 24. This coil 24 is directly in the path of the air delivered from the blower through the passage 23, to cool the passing air.

The cooling of warm air as is well known causes the condensation of moisture. In the ordinary refrigeration apparatus as shown at 3 in Fig. 1 this moisture appears as a coating of frost or ice upon the expansion coils within the refrigerator. However, inasmuch as the air cooling apparatus will seldom if ever be operated at or below freezing temperature, frost or ice will not ordinarily be formed upon the coils but this moisture will be deposited as drops of water. Much of these water drops will be evaporated and entrained with the passing current of air from the fan or blower. Any excess of moisture not blown away, or immediately returned to the passing current of air will be deposited as drip in the bottom of the compartment of tunnel 10. To this end the bottom of the compartment 10 is provided with a condensation receptacle 25, which will receive any excess moisture. To increase the humidity of the cooled air, if desired, an additional supply of water may be added to the condensation in the pan 25. The current of air passing over this body of water in the pan or receptacle 25 will tend to evaporate the water and take up moisture until it is fully charged or humidified before being discharged through the outlet 15 into the room or chamber to be cooled.

Although not essential to the operation, the outlet 15 may be provided with an adjustable shutter or closure 26, to be closed when the air circulation apparatus is not in operation in order that the temporary operation of the refrigerating coil within the compartment may reduce the temperature therein preparatory to the next operation of the fan or blower. Such shutter or closure for the outlet 15 may be manually operated or may be operated mechanically from the fan or blower. The shutter vanes 26 are preferably provided with light closure springs which tend to normally close the shutter vanes. The vanes are opened against the tension of such springs by the pressure of the air blast from the fan or blower. Thus the thermostat 16 in stopping the fan motor would also permit the closure of the outlet shutter and such shutter will open when the motor again starts. In such case the hand valve shown in Fig. 3 or a separate thermostatically controlled valve would preferably though not necessarily be employed to control the flow of refrigerant through the coils. An independent thermostatic control 27 may be provided for the shutter vanes 26' to automatically adjust the vanes of the shutter in accordance with variations of room temperature, or the temperature of the current of cool air being delivered. By employing a thermostatic control for the fan or blower, and if desired also for the refrigerant coils, when the temperature of the room has been lowered by the operation of the apparatus or by outside weather conditions to the desired degree, the circulating fan 14 is automatically stopped. It is also desirable to shut off the flow of refrigerant through the coils at a predetermined temperature, which may be somewhat below that at which the fan stops, as otherwise the continued circulation of refrigerant therethrough would create an excessive degree of refrigeration within the compartment which would be useless, expensive and possibly injurious to the apparatus. To guard against the accumulation of excess water or condensation an overflow outlet 28 is preferably provided from the pan 25.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown but that the means and construction herein disclosed comprises the preferred form of several modes of putting the invention into effect and the invention is therefore claimed in any of its forms or modifications within the legitimate and valid scope of the appended claims.

Having thus described my invention, I claim:

1. In a ventilating apparatus of the character described, the combination with a refrigerating system having an excess capacity factor of an air cooling apparatus including a refrigerating coil additional to and removed from that of the refrigerating system but connected to and operated by said refrigerating system, an air compartment in which the coil is located, said compartment discharging into a chamber to be cooled, a blower directing a current of air through said compartment and about said coils into the chamber and thermostatic means controlling the operation of said air cooling apparatus independent of the refrigerating system.

2. In a ventilating apparatus of the character described, a mechanically operated refrigerating apparatus, an air cooling apparatus separate from said refrigerating apparatus, a compressor and condenser unit common to the refrigerating apparatus and air cooling apparatus, said air cooling apparatus including a refrigerating coil, means for circulating refrigerant therethrough, a compartment in which said coil is located, said compartment having an outlet into a room to be cooled and means for circulating a stream of air through the compartment past said coil and discharging it through the outlet opening into the room and thermostatic means for controlling the flow of air through said air cooling apparatus independently of the operation of said refrigerating apparatus.

3. In a ventilating apparatus, a refrigerating coil, means for supplying refrigerant medium thereto, a compartment in which the coil is located, said compartment having an outlet into a room to be cooled, a blower for directing a current of air through the compartment, past the coil and into the room, and a water container over which the air passes prior to entering the room and a thermostatic control device located outside said compartment independent of said blower for regulating the volume of air discharged thereby through said compartment.

4. In a ventilating apparatus, a refrigerating unit, means for supplying refrigerant medium thereto, a compartment in which the unit is located having an outlet opening into a room to be cooled, a blower for directing a current of air upon the refrigerating unit within the compartment and thence through the outlet into the room, and means located outside said compartment for thermostatically controlling the discharge of cooled air in accordance with fluctuations of temperature, said means controlling the refrigerant supplied to the refrigerating unit.

5. In a ventilating apparatus, a refrigerating unit, means for supplying refrigerant medium thereto, a compartment in which the unit is located having an outlet opening into a room to be cooled, a blower for directing a current of air upon the refrigerating unit within the compartment and thence through the outlet into the room, and means located outside said compartment for automatically regulating the supply of refrigerant to said unit in accordance with fluctuations of temperature.

6. In a ventilating apparatus, the combination with a refrigerating apparatus of a separate air cooling unit, means common to the refrigerating apparatus and air cooling unit for supplying refrigerant medium thereto, a compartment in which the unit is located having an outlet opening into a room to be cooled, a blower for directing a current of air upon the refrigerating unit within the compartment and thence through the outlet into the room, and means operating independently of the refrigerating apparatus for automatically controlling the quantity of cooled air discharged by operation of the blower in accordance with fluctuations of temperature.

7. In a ventilating apparatus, a refrigerating unit, means for supplying refrigerant medium thereto, a compartment in which the unit is located having an outlet opening into a room to be cooled, a blower for directing a current of air upon the refrigerating unit within the compartment through the outlet into the room, and means located in the room outside of the compartment for automatically regulating the flow of air through said outlet into the room, said means controlling the refrigerant supplied to the unit.

8. In a ventilating apparatus, the combination with a refrigerating apparatus, of a separate air cooling unit, means common to the refrigerating apparatus and air cooling unit for supplying refrigerant medium thereto, a compartment in which the unit is located having an outlet opening, into a room to be cooled, a blower for directing a current of air upon the refrigerating unit within the compartment and thence through the outlet into the room, and means for controlling the operation of the refrigerating apparatus and the cooling unit independently of each other.

9. In a ventilating apparatus, a refrigerating unit, means for supplying refrigerant thereto, a compartment in which said refrigerating unit is located having an outlet opening into a room to be cooled, means for inducing a current of air through said compartment, a series of baffles dividing the compartment into a plurality of interconnected chambers through which the air is circulated, said unit having successive portions thereof located in different chambers and subjected successively to the passing current of air and a series of shutter devices adjustably regulated in accordance with the passing air current.

10. In a ventilating apparatus, a refrigerating unit, means for supplying refrigerant thereto, a compartment in which the unit is located having an outlet opening into a room to be cooled, means for inducing a flow of air through said compartment, an adjustable shutter for the discharge outlet from said compartment and thermostatic control means for automatically adjusting said shutter and initiating the flow of air through said compartment when the room temperature attains a maximum high degree and arresting such flow of air when the room temperature decreases to a predetermined low degree.

11. In a ventilating apparatus, a refrigerating unit, means for supplying refrigerant thereto, a compartment in which the unit is located having an outlet opening into a room to be cooled, means for inducing a flow of air through said compartment, and thermostatic control means common to both the air and refrigerant supplies and regulating the air cooling operation in accordance with fluctuations of the room temperature.

12. In a ventilating apparatus, a refrigerating unit, means for supplying refrigerant thereto, a compartment in which the unit is located having an outlet opening into a room to be cooled, means for inducing a flow of air through said compartment, and thermostatic means to control the air and refrigerant supplies and regulating the air cooling operation in accordance with fluctuations of the room and compartment temperatures.

13. The combination with a mechanically operated refrigerator, including a heat exchange unit for refrigerant and a separate air cooling apparatus also including a heat exchange unit for refrigerant, a compressor-condenser unit common to the refrigerator and air cooling apparatus, and a thermostatic control device associated with the refrigerator controlling the operation of the compressor-condenser unit independently of the air cooling apparatus.

14. The combination with a mechanically operated refrigerator, including a heat exchange unit for refrigerant and a separate air cooling apparatus also including a heat exchange unit for refrigerant, a compressor-condenser unit common to the refrigerator and air cooling apparatus, means for inducing a flow of air through the air cooling apparatus, and thermostatic means for controlling the circulation of air through the cooling apparatus independently of the circulation of refrigerant medium.

15. In a ventilating apparatus, a cooling unit, means for supplying refrigerant medium thereto, a compartment in which the unit is located having an outlet opening into a room to be cooled, a blower for directing a current of air upon the cooling unit within the compartment and thence through the outlet into the room, and means responsive to the room temperature for thermostatically controlling the discharge of the cooled air in accordance with fluctuations of temperature of the air in the room, and for controlling the refrigerant supplied to the cooling unit.

16. In a ventilating apparatus, a cooling unit, means for supplying refrigerant medium thereto, a compartment in which the unit is located having an outlet opening into a room to be cooled, a blower for directing a current of air upon the cooling unit within the compartment and thence through the outlet into the room, and means responsive to the room temperature for automatically regulating the supply of refrigerant to said unit in accordance with fluctuations of the temperature of the air in the room.

17. In a ventilating apparatus, a cooling unit about which a current of air to be cooled is circulated, means for supplying refrigerant thereto, a compartment in which the unit is located and having an outlet into a room to be cooled through which the current of cooled air flows into the room after having passed about the cooling unit, and thermostatic means responsive to the room temperature for controlling the flow of air in accordance with fluctuations of room temperature, and for controlling the refrigerant supplied to the cooling unit.

18. In a ventilating apparatus of the character described, the combination with a refrigerating system having an excess capacity factor, of an air cooling apparatus including a refrigerating unit additional to and removed from that of the refrigerating system, said air cooling apparatus being connected to and operated by said refrigerating system, an air compartment in which the refrigerating unit is located, said compartment discharging into a chamber to be cooled and a blower directing a current of air through said compartment and about said refrigerating unit and thence into said chamber.

19. In a ventilating apparatus of the character described, a mechanically operated refrigerating apparatus, an air cooling apparatus separate from said refrigerating apparatus, a compressor and condenser unit common to the refrigerating apparatus, said air cooling apparatus including a refrigerating unit, means for circulating refrigerant therethrough, a compartment in which said unit is located, said compartment having an outlet into a room to be cooled, and means for circulating air to be cooled through said compartment.

20. In a ventilating apparatus, the combination with a refrigerating apparatus including a cold storage means, of a separate air cooling unit for a room to be cooled, means common to the refrigerating apparatus and air cooling unit for supplying refrigerant medium thereto, a compartment in which the unit is located having an outlet opening into the room and a blower for directing a current of air upon the refrigerating unit within the compartment and thence through the outlet into the room.

21. In a ventilating apparatus, the combination with a refrigerating apparatus including cold storage means, of a separate air cooling unit, means common to the refrigerating apparatus and air cooling unit for supplying refrigerant medium thereto, a compartment in which the unit is located having an outlet opening into a room to be cooled and a suction blower for directing the current of air from the room upon the refrigerating unit within the compartment and thence through the outlet into the room.

22. In a ventilating apparatus, the combination with a refrigerating apparatus including cold storage means, of a separate air cooling unit, means common to the refrigerating apparatus and air cooling unit for supplying refrigerant medium thereto, a compartment in which the unit is located having an outlet opening and an inlet opening into a room to be cooled, and a blower for directing a current of air upon the refrigerating unit within the compartment and thence through the outlet into the room.

23. In a device of the class described, the combination with a refrigerating apparatus having a cooling means of a separate air cooling unit, means common to the refrigerating apparatus and the air cooling unit for supplying a refrigerant medium thereto, means responsive to the temperature of the cooling compartment for controlling the refrigerant supplied to the refrigerating apparatus, and means responsive to the temperature of the room for controlling the refrigerant supplied to the cooling unit.

24. A refrigerating mechanism including an air directing form and a coil of substantially triangular conformation associated therewith means for inducing a flow of air through the air directing form past the coil, an adjustable shutter for said air directing form for regulating the flow of air, and means for automatically adjusting the shutter in accordance with temperature fluctuations.

25. A refrigerating mechanism comprising a refrigerating coil arranged in substantially triangular conformation, air directing means mounted in spaced relation thereto means for inducing a flow of air past the coil and thermostatic control means influenced by the discharged air for regulating the temperature thereof.

26. In an air cooling attachment for fans the combination with a fan structure, of an annular band carried by said fan structure in front of the fan-blades, a series of radial plates extending inwardly from the inner surface of the annular band and a central cooling receptacle sustained by the inner ends of the radial plates.

27. In an air cooling attachment for electric fans, the combination with a fan structure having fan-blades, of an annular shell open at both ends and carried by the fan structure, a series of flat members extending radially inwardly from said annular shell and forming a series of radial air passages and a central receptacle carried by the inner ends of said radial members.

28. A refrigerating system including a cabinet having a cold storage compartment, a second cabinet having air passages communicating with a room to be cooled, cooling units located in said cabinets, means for circulating a refrigerant, branches extending from said means to the cooling units for supplying the refrigerant thereto, return branches extending from the cooling units to said means, and control mechanism for maintaining the medium surrounding said cooling units at different temperatures.

29. A refrigerating system, including a cabinet having a cold storage compartment, a second cabinet having air passages communicating with a room to be cooled, cooling units located in said cabinets, means for supplying a refrigerant to said cooling units, and means associated with said second cabinet for controlling the supply of refrigerant to the cooling unit located therein, said control means responding to the temperature of the air of the room.

30. In a cooling system, a cabinet having openings communicating with a room to be cooled, a thermostatically controlled closure for one of said openings, an intermittently operated fan mounted in the cabinet for circulating air from the room through the cabinet, a thermostat subject to the influence of the circulated air the closure opening in response to the flow of air propelled by the fan and closing the opening when the fan stops.

31. A cabinet having openings, a closure for one of the openings, means for intermittently circulating air through the cabinet, and thermostatic means responding to the circulated air for actuating the closure adapted to permit the opening of the closure when said first means is inoperative.

32. A cabinet having openings for the circulation of air, means for intermittently circulating the air, a thermostatically controlled closure for one of said openings normally in a closed position, and thermostatic means responsive to the circulation of air permitting the closure to open when said first means circulates the air.

33. In a refrigerating system including a cabinet having passages opening into a room to be cooled, a cooling unit in said cabinet, a fan for circulating air through said passages to and from the room, means responsive to the temperature of the room for controlling the circulation of air through the cabinet, and a thermostatically controlled closure for one of said openings normally in closed position but opening in response to the circulation of air.

34. In a cooling unit, a fan mounted for oscillation about an axis other than the axis of rotation, said fan including a motor housing, a cooling unit carried by the housing, said cooling unit including a helical coil tapering away from the fan.

35. In a cooling unit a fan having a motor housing mounted for oscillation, a cooling unit carried by said housing arranged for oscillation therewith, said cooling unit including a coil for progressively intersecting the air circulated by the fan.

JOHN Q. SHERMAN.

OVER

CERTIFICATE OF CORRECTION.

Reissue No. 20,804. July 19, 1938.

JOHN Q. SHERMAN.

It is hereby certified that error appears in the printed specification of the above numbered patent requiring correction as follows: Page 5, first column, line 8, claim 22, for the word "coiling" read cooling; and that the said Letters Patent should be read with this correction therein that the same may conform to the record of the case in the Patent Office.

Signed and sealed this 30th day of August, A. D. 1938.

Henry Van Arsdale (Seal. Acting Commissioner of Patents.